United States Patent
Souschek et al.

(10) Patent No.: US 10,589,588 B2
(45) Date of Patent: Mar. 17, 2020

(54) TRANSVERSE LINK FOR A WHEEL SUSPENSION OF A VEHICLE AND METHOD FOR THE PRODUCTION THEREOF

(71) Applicant: Ford Global Technologies, LLC, Dearborn, MI (US)

(72) Inventors: Rainer Souschek, Aachen (DE); Raphael Koch, Odenthal (DE); Daniel Mainz, Herzogenrath (DE); Theo Kueppers, Waldfeucht (DE)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 15/823,621

(22) Filed: Nov. 28, 2017

(65) Prior Publication Data

US 2018/0154720 A1 Jun. 7, 2018

(30) Foreign Application Priority Data

Dec. 2, 2016 (DE) .......................... 10 2016 224 023

(51) Int. Cl.
*B60G 7/00* (2006.01)

(52) U.S. Cl.
CPC .............. *B60G 7/001* (2013.01); *B60G 7/008* (2013.01); *B60G 2204/41* (2013.01);
(Continued)

(58) Field of Classification Search
CPC ........ B60G 7/001; B60G 7/005; B60G 7/008; B60G 3/06; B60G 2200/142;
(Continued)

(56) References Cited

U.S. PATENT DOCUMENTS 5,788,263 A * 8/1998 VanDenberg .......... B60G 7/001
                                          280/124.116
5,992,867 A * 11/1999 Kato ....................... B60G 3/06
                                          280/124.134
(Continued)

FOREIGN PATENT DOCUMENTS

| DE | 19720134 A1 * | 11/1997 | .............. B23P 13/04 |
| DE | 19961425 | 7/2001 | |

(Continued)

OTHER PUBLICATIONS

Bhate, PhD, Dhruv, Additive Manufacturing—Back to the Future!, PADT, Inc.—The Blog, Jan. 28, 2016, at URL http://www.padtinc.com/blog/additive-mfg/additive-manufacturing.
(Continued)

*Primary Examiner* — Laura Freedman
(74) *Attorney, Agent, or Firm* — Burris Law, PLLC

(57) ABSTRACT

The present disclosure provides a transverse link for a wheel suspension of a vehicle that includes at least one wheel-side attachment structure and at least one structure-side attachment structure. The wheel-side and structure-side structures are connected to each other by a connection structure which extends therebetween. The connection structure and/or at least one of the attachment structures is/are produced by a generative production method. At least one of the attachment structures is constructed as a generatively produced bushing which has an inner sleeve and an outer sleeve surrounding the inner sleeve. The sleeves are connected to each other by a fold-like structure. The present disclosure further provides a method for producing such a transverse link.

12 Claims, 3 Drawing Sheets

(52) U.S. Cl.
CPC .... *B60G 2206/122* (2013.01); *B60G 2206/70* (2013.01); *B60G 2206/7105* (2013.01); *B60G 2206/80* (2013.01)

(58) Field of Classification Search
CPC ...... B60G 2200/1424; B60G 2200/154; B60G 2204/143; B60G 2204/1431; B60G 2204/148; B60G 2204/41; B60G 2204/416; B60G 2206/122; B60G 2206/70; B60G 2206/7105; B60G 2206/80; B33Y 80/00
See application file for complete search history.

(56) References Cited

U.S. PATENT DOCUMENTS

| | | | | |
|---|---|---|---|---|
| 6,419,215 | B1* | 7/2002 | Johnson | B60G 7/02 267/140.12 |
| 6,749,360 | B2 | 6/2004 | Abels | |
| 6,905,129 | B2* | 6/2005 | Runte | B60G 7/001 280/124.134 |
| 6,910,670 | B2* | 6/2005 | Kato | B60G 7/02 248/562 |
| 7,293,787 | B2* | 11/2007 | Nunez | B60G 7/001 280/124.1 |
| 7,364,176 | B2* | 4/2008 | Saitoh | B60G 7/02 267/140.12 |
| 7,556,273 | B2 | 7/2009 | Streubel et al. | |
| 7,938,417 | B2* | 5/2011 | Ersoy | B60G 7/001 280/124.134 |
| 8,100,423 | B2* | 1/2012 | Kruse | B60G 7/001 280/124.134 |
| 8,414,003 | B2* | 4/2013 | Yu | B60G 7/001 280/124.134 |
| 8,690,176 | B2* | 4/2014 | Perry | B21D 53/88 280/124.134 |
| 8,950,969 | B2* | 2/2015 | Klaukien | F16B 5/01 244/131 |
| 9,010,783 | B2* | 4/2015 | Meyer | F16C 11/069 280/124.134 |
| 9,115,778 | B2* | 8/2015 | Wagner | B60G 11/08 |
| 9,506,517 | B2* | 11/2016 | Cha | B60G 7/008 |
| 9,643,251 | B2* | 5/2017 | Zalewski | B29C 64/153 |
| 9,925,724 | B2* | 3/2018 | Long | B23K 15/0086 |
| 10,274,935 | B2* | 4/2019 | Vernon | G05B 19/4099 |
| 2005/0057860 | A1* | 3/2005 | Lau | G11B 5/4813 360/265.7 |
| 2005/0281610 | A1* | 12/2005 | MacLean | F16C 7/026 403/56 |
| 2007/0272051 | A1* | 11/2007 | Kamei | B60G 7/001 74/579 R |
| 2013/0026730 | A1* | 1/2013 | Galasso | B62K 25/08 280/276 |
| 2014/0163445 | A1 | 6/2014 | Pallari et al. | |
| 2014/0170012 | A1* | 6/2014 | Delisle | B22F 3/1055 419/6 |
| 2015/0190971 | A1 | 7/2015 | Musuvathy et al. | |
| 2016/0229127 | A1* | 8/2016 | Halliday | B29C 67/0092 |
| 2016/0245710 | A1* | 8/2016 | Twelves, Jr. | F16F 1/025 |

FOREIGN PATENT DOCUMENTS

| | | |
|---|---|---|
| DE | 102005004917 | 8/2006 |
| DE | 102009058359 | 6/2011 |
| DE | 102013219250 | 3/2014 |
| DE | 102012218686 | 4/2014 |
| DE | 102013223752 | 5/2015 |
| WO | 2013/163398 | 10/2013 |
| WO | 2015/040410 | 3/2015 |
| WO | 2015/053940 | 4/2015 |

OTHER PUBLICATIONS

Altair HyperWorks, LZN (Laser Zentrum Nord) Success Story—Combining Topology Optimization with Laser Additive Manufacturing Reveals New Potential for Lightweight Structures, Altair Engineering, Inc. 2014.

\* cited by examiner

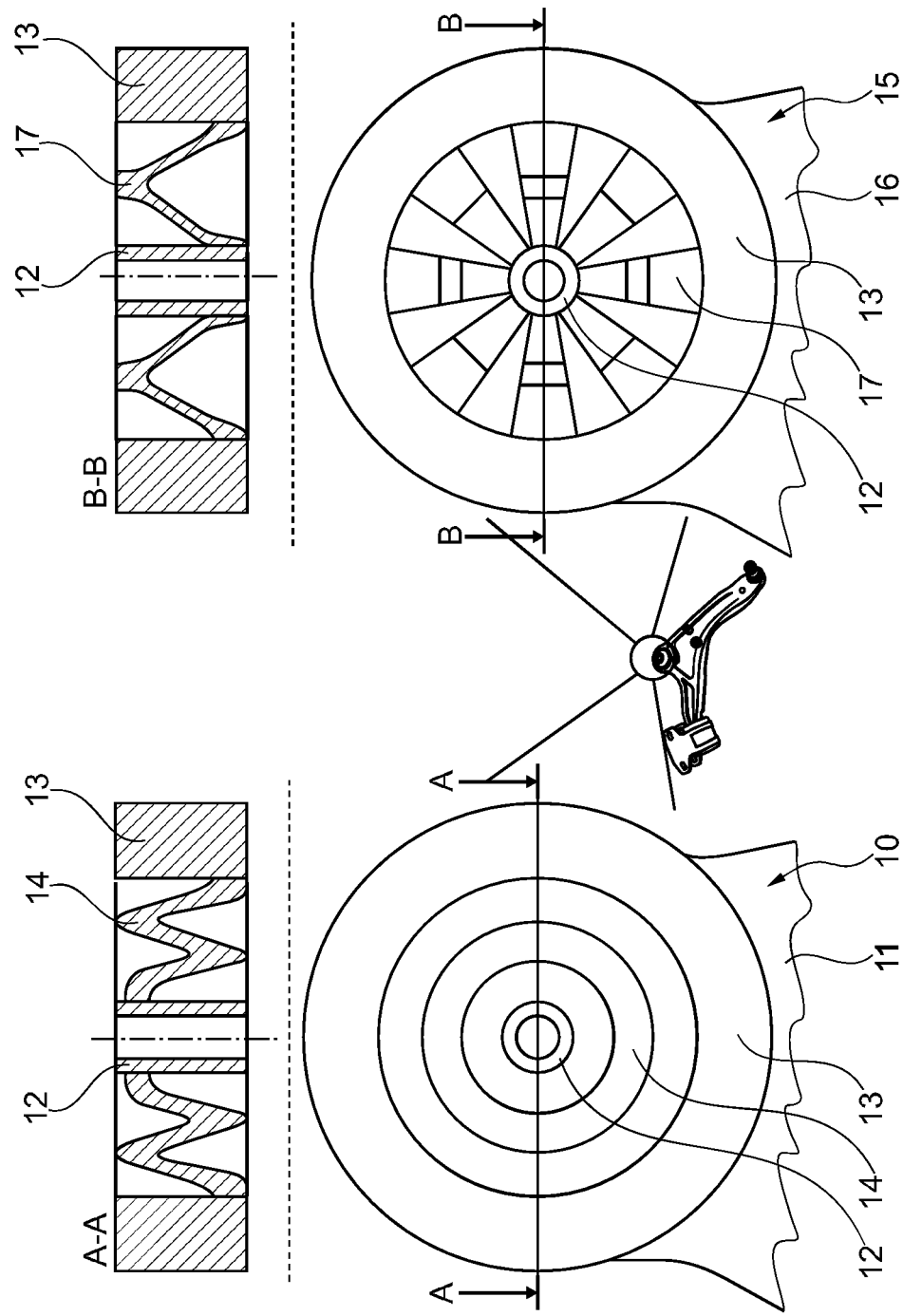

TRANSVERSE LINK FOR A WHEEL SUSPENSION OF A VEHICLE AND METHOD FOR THE PRODUCTION THEREOF

CROSS-REFERENCE TO RELATED APPLICATIONS

This application claims priority to and the benefit of DE 102016224023.4 filed on Dec. 2, 2016. The disclosure of the above application is incorporated herein by reference.

FIELD

The present disclosure relates to a transverse link for a wheel suspension of a vehicle, in particular a motor vehicle.

BACKGROUND

The statements in this section merely provide background information related to the present disclosure and may not constitute prior art.

Wheel guiding links, such as, for example, transverse links, longitudinal links or tie bars are used in practically all wheel suspensions and axles of vehicles, in particular motor vehicles, and serve to movably attach or to limit the degrees of freedom of movement of a wheel with respect to a vehicle structure. They generally serve to transmit forces and where applicable also torsion and bending torques between wheel carriers of the vehicle and vehicle structure or an auxiliary frame which is connected to the vehicle structure. The forces are transmitted via the wheel guiding links, wherein, depending on the arrangement in the vehicle, a distinction can be made between transverse, longitudinal and oblique links. The respective links must in this instance accordingly be configured and suitable for the transmission of the high forces occurring during braking, acceleration and deflection operations. They are fitted in an articulated manner at the respective ends thereof, mostly via rubber/metal bearings, to the wheel carrier and/or the vehicle structure or auxiliary frame.

Transverse links in a single-wheel suspension are arranged on the vehicle substantially transversely relative to the travel direction. They guide the wheel carrier approximately in a vertical direction and transmit transverse forces between the wheel and vehicle structure. In order to transmit longitudinal forces, the transverse links may be constructed in a planar manner, for example, as triangular or trapezoidal links so that, when viewed in the longitudinal direction of the vehicle, they are connected in a wide arrangement to the vehicle structure or to the auxiliary frame which is connected to the vehicle structure and, when the wheels are not deflected, are also attached to the wheel carrier in a wide arrangement.

Generally, wheel guiding links are produced from a metal, in most cases as a forged component, die-cast component or shaped sheet metal component. In this instance, in addition to steel, light metal, for example, aluminum, is also used in order to also achieve the desired lightweight construction in modern motor vehicle construction in the region of the wheel suspension.

One possibility for further weight saving with a transverse link is set out, for example, in U.S. Pat. No. 6,749,360. The transverse link has a framework-like structure which complies with lightweight construction and nonetheless meets the safety requirements placed on the transverse link, for example, with regard to strength, rigidity and flexibility.

U.S. Pat. No. 7,556,273 further discloses a transverse link in the form of a hybrid component which is formed from a shell member comprising high-strength steel and grid reinforcements which are connected thereto in the form of intersecting ribbings.

WO 2015/053940 A1 discloses a component which has an inner structure which is produced by a generative, layering production method. The component may, for example, be a connection piece of a telescope-like leg or a bolt bush. In the case of a bolt bush, the inner structure is inserted between an outer ring, which secures the outer wall of the bush and an inner ring which receives the bolt. Depending on the selected structure and thickness of the structure, a desired plastic or resilient deformability of the inner structure can be achieved.

Furthermore, DE 10 2013 219 250 A1 describes a structural element in the chassis of a motor vehicle, which has a reinforcement which is constructed by laser melting. Inter alia a wheel, a wheel carrier or a wheel-guiding link are set out as structural elements. The structural element is constructed with a lightweight material and is reinforced at least at a more highly loaded location by similar or high-strength or higher-strength material produced by laser melting, in particular by a Selective Laser Melting method (SLM) or a Laser Metal Deposition method (LMD). The material applied by laser melting may be applied or produced in the form of ribs or a net or in a planar manner with a thickness which varies over the surface. The structural element may, for example, be produced with an aluminum alloy initially in conventional manner (for example, by forging), but it can also be constructed in a first production step in a net-like manner in accordance with the SLM method and in a second production step be formed to form a closed surface structure or at least to form a surface structure.

Furthermore, U.S. Patent Publication No. US 2015/0190971 A1 discloses a method for topology optimization of grid structures for generative production methods.

WO 2015/040410 A2 further discloses a generative production method for a product in which support carriers for supporting at least a portion of the product are constructed integrally therewith. The support carriers intersect with each other and accordingly form a grid, wherein the grid is of irregular form.

WO 2013/163398 A1 further discloses a heat exchange pipe with a grid structure by which the improved heat exchange properties can be achieved by an increased heat exchange face. The grid structure is produced by a generative production method.

U.S. Patent Publication No. US 2014/0163445 A1 describes a generative production method for producing freeform structures. The fixed freeform structures have a grid structure which is formed from small individual cells in order to reduce the density of the freeform structure and the weight thereof.

SUMMARY

The present disclosure provides a transverse link for a wheel suspension of a vehicle, in particular a motor vehicle, and a method for the production thereof, wherein the transverse link can be produced with little material complexity and nonetheless complies with the required safety and comfort requirements, such as, for example, strength, rigidity and flexibility. Furthermore, the transverse link is intended to be a lightweight construction and to enable rapid production.

It should be noted that the features which are set out individually in the following description can be combined with each other in any technically advantageous manner and set out other variations of the present disclosure. The description additionally characterizes and specifies the present disclosure, in particular in connection with the figures.

According to the present disclosure, a transverse link for a wheel suspension of a vehicle has at least one wheel-side attachment structure and at least one structure-side attachment structure. For example, an attachment structure in the context of the present disclosure may be a bush/bushing, a ball joint or a journal and the like, by which the connection of the transverse link to a vehicle structure or an auxiliary frame which is connected thereto or another wheel suspension component, for example, a wheel carrier, is carried out. The attachment structures are connected to each other by a connection structure which extends therebetween. According to the present disclosure, the connection structure and/or at least one of the attachment structures is/are produced by a generative production method, also known as additive manufacturing.

The connection structure and/or the attachment structure is/are produced during the generative production method (also additive production method) generally directly on the basis of computer data models of the respective structure, for example, CAD models, from formless (for example, liquids, powder and the like) or form-neutral (for example, strip or wire-like) material by chemical and/or physical processes. Generative production methods may, for example, include selective laser melting, electron beam melting or laser application welding or generally 3D printing.

During 3D printing, workpieces are constructed in layers. The construction is carried out in a computer-controlled manner from one or more liquid or solid materials, for example, metals (for example, aluminum or steel) or metal alloys, plastics materials, synthetic resins or ceramic materials, in accordance with predetermined dimensions and shapes (CAD). During the construction, physical or chemical curing or melting processes take place.

Generative production methods are materially efficient and save resources. For the production of the connection structure and/or the attachment structure, only the material which is actually contained in the connection structure and/or in the attachment structure is used. There is no notable waste as a result of the production. Furthermore, for the production of the connection structure and/or the attachment structure, there are required no specific tools which have stored the respective geometry of the connection structure and/or the attachment structure, such as, for example, casting molds. Generative production methods thereby have significant cost and time advantages with respect to conventional production methods, for example, casting, pressing, shaping, machining and the like.

According to the present disclosure, at least one of the attachment structures is constructed as a generatively produced bushing which has an inner sleeve and an outer sleeve which surrounds the inner sleeve with spacing, which sleeves are connected to each other by a fold-like structure. It is thereby possible for a rubber or plastics material bushing which is otherwise intended to be used in conventional manner to be directly integrated functionally in the transverse link and to be produced therewith in one production step. The fold-like structure, in a particularly advantageous manner, for example, by selecting the number of folds and/or the thickness of the folds, enables the rigidity and flexibility of the bushing to be defined, as can, for example, also be provided for by a conventional rubber bushing. The desired wheel guiding properties, rigidity and flexibility of the transverse link can thus be provided.

In place of the fold-like structure, grid-like and/or honeycomb-like and/or bionic, for example, bone-like structures may also be constructed to connect the inner bushing to the outer bushing.

Furthermore, other attachment structures, such as, for example, ball joints or journals, can also be produced using the generative production method with the above-described properties.

In order to achieve a clear weight advantage of the connection structure and/or attachment structure of the transverse link as produced by the generative production method compared with a conventional production method, the computer data models of the workpiece can be further optimized in terms of the topology thereof prior to the 3D printing (CAD/CAE). It is thus possible using such a topology optimization to selectively map the load paths which predetermine the significant structure of the workpiece which is intended to be produced in order to enable genuine lightweight construction.

The load path structure can additionally be adapted to different load requirements in a selective manner by the selection of a specific material, for example, a metal or a metal alloy and/or different cross-sectional shapes and/or a grid structure and/or a honeycomb structure. It is thereby possible for different mechanical properties of the transverse link, such as, for example, strength, rigidity and flexibility, depending on the load requirement to be achieved in a selective manner at selected locations on the transverse link, and at the same time for the required safety and comfort requirements of the transverse link to be complied with.

The grid-like and/or honeycomb-like structures may also be used to construct bionic structures. A bionic construction is intended to be understood in this instance to be that phenomena and/or constructions from nature are transferred to the technical construction of the connection structure and/or attachment structure of the transverse link. It is thus possible for the connection structure and/or attachment structure to be constructed at least partially, for example, in a bone-like manner with a porous core. A bone-like structure may, in one form, have a number of hollow spaces which are produced in a predetermined arrangement or in a free arrangement within a predetermined region.

Accordingly, an advantageous form of the present disclosure makes provision for the connection structure, as long as it is produced in a generative manner, and/or at least one of the attachment structures, as long as it is produced in a generative manner, to be constructed at least partially in a porous and/or bionic and/or grid-like and/or honeycomb-like manner.

Furthermore, as a result of the generative production method of the connection structure and/or the attachment structure and as a result of the selection of the materials used, the construction of porous, bionic, grid-like and/or honeycomb-like constructions, there can also be produced sandwich structures, in which, for example, an internal force-neutral layer of the connection structure and/or attachment structure is produced with a lower material density, and which are combined with outer, more rigid shell elements.

An advantageous form of the present disclosure makes provision for the connection structure, as long as it is produced in a generative manner, and/or at least one of the attachment structures, as long as it is produced in a generative manner, each to have one or at least two different materials. Particularly, in one form, the materials are metals, for example, aluminum, titanium, steel and the like, or metal alloys thereof. Different materials can thus be provided on the connection structure and/or attachment structure in order to provide the connection structure and/or attachment structure with different specific properties at specific locations.

According to another advantageous form of the present disclosure, the connection structure is not produced in a generative manner but instead in a conventional manner. Accordingly, at least one attachment structure is produced in a generative manner and "printed" onto the connection structure or connected by a non-positive-locking or positive-locking connection. In this manner, it is possible, for example, to implement the above-described functional integration of a bushing, a ball joint and/or a journal on the transverse link.

A construction of the transverse link with at least one conventionally produced attachment structure, for example, bushing, ball joint or journal, which are connected to each other by a generatively produced connection structure, is also possible.

According to another aspect of the present disclosure, a method for producing a transverse link for a wheel suspension of a vehicle is provided, wherein the transverse link has at least one wheel-side attachment structure and at least one structure-side attachment structure, which are connected to each other by a connection structure which extends therebetween. For example, an attachment structure in the context of the present disclosure may be a bushing, a ball joint or a journal and the like, by which the attachment of the transverse link to a vehicle structure or an auxiliary frame which is connected thereto or to another wheel suspension component, for example, a wheel carrier, is carried out. The method makes provision for the connection structure and/or at least one of the attachment structures to be produced by a generative production method, wherein at least one of the attachment structures is constructed as a generatively produced bushing which has an inner sleeve and an outer sleeve which surrounds the inner sleeve with spacing, which sleeves are connected to each other by a fold-like structure.

With regard to the actions and advantages of such a method, reference is made at this location to the above description of the transverse link according to the present disclosure since they are accordingly also used in the method according to the present disclosure.

Of course, it is within the scope of the present disclosure to use a generative production method as described above in order to produce a transverse link as described above which is suitable for a wheel suspension of a vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3A is a plan view and a cross-sectional view of an attachment structure of another form of a transverse link according to the present disclosure; and FIG. 3B is a plan view and a cross-sectional view of an attachment structure of another form of a transverse link according to the present disclosure.

Figure 1:
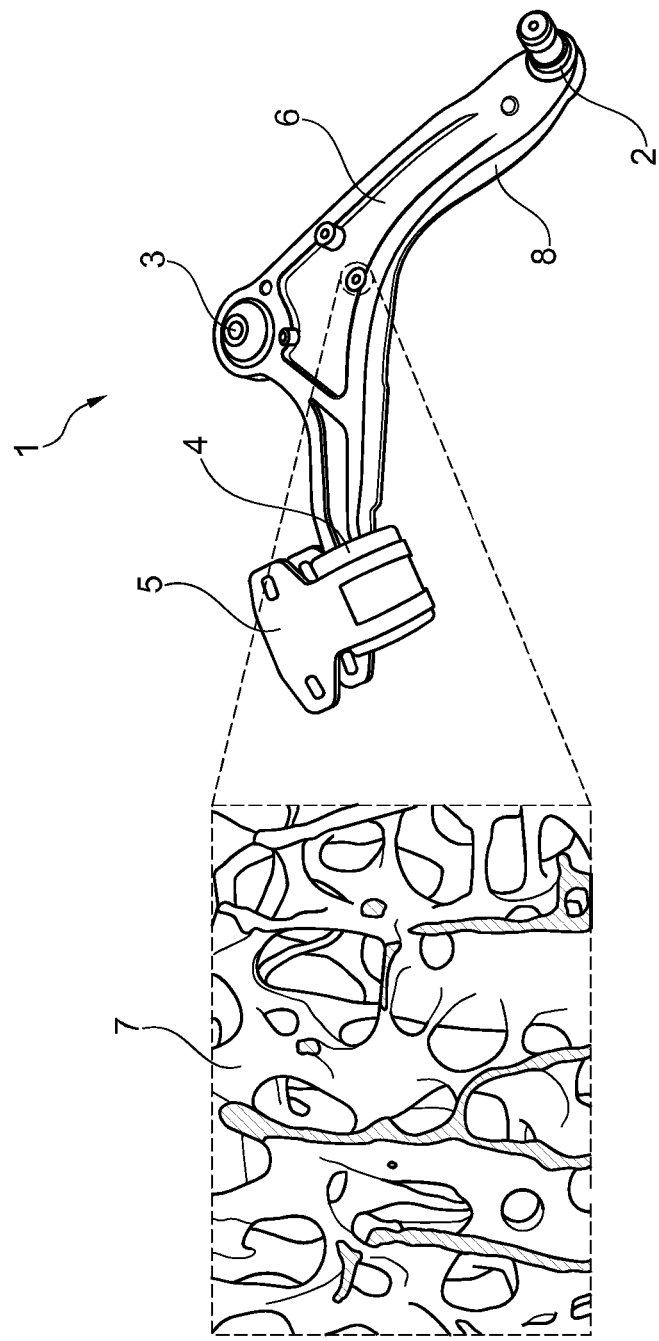
FIG. 1 is a perspective view of one form of a transverse link according to the present disclosure, including a detail view of its bone-like inner structure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows in the right-hand half of the image a perspective view of one form of a transverse link 1 according to the present disclosure. As can be seen, the transverse link 1 has a wheel-side attachment structure 2 and two structure-side attachment structures 3 and 4. The wheel-side attachment structure 2 is in the transverse link 1 shown a ball joint and is used to attach a wheel carrier (not illustrated) to the transverse link 1 in an articulated manner. The attachment structure 2 or the ball joint is in this form of the transverse link 1 conventional, that is to say, not produced in a generative manner. The first structure-side attachment structure 3 is in the transverse link 1 illustrated a bushing which is produced in a generative manner, as will be explained below with reference to the description of FIG. 2. The second structure-side attachment structure 4 is in the transverse link 1 shown a journal which cannot be seen in FIG. 1 since it is received in a journal retention member 5. The two structure-side attachment structures 3 and 4 serve to attach the transverse link 1 to a vehicle structure or an auxiliary frame which is connected thereto.

All three attachment structures 2, 3 and 4 are connected to each other by a connection structure 6. The connection structure 6 is in this form of the transverse link 1 shown in FIG. 1 produced in a generative manner. In particular the connection structure 6 has, in a force-neutral inner region, a bone-like inner structure 7 which is illustrated to an enlarged scale in the left half of the image of FIG. 1. The bone-like bionic inner structure 7 of the transverse link is in this form shown combined with external, more rigid, similarly generatively produced shell elements 8.

Figure 2:
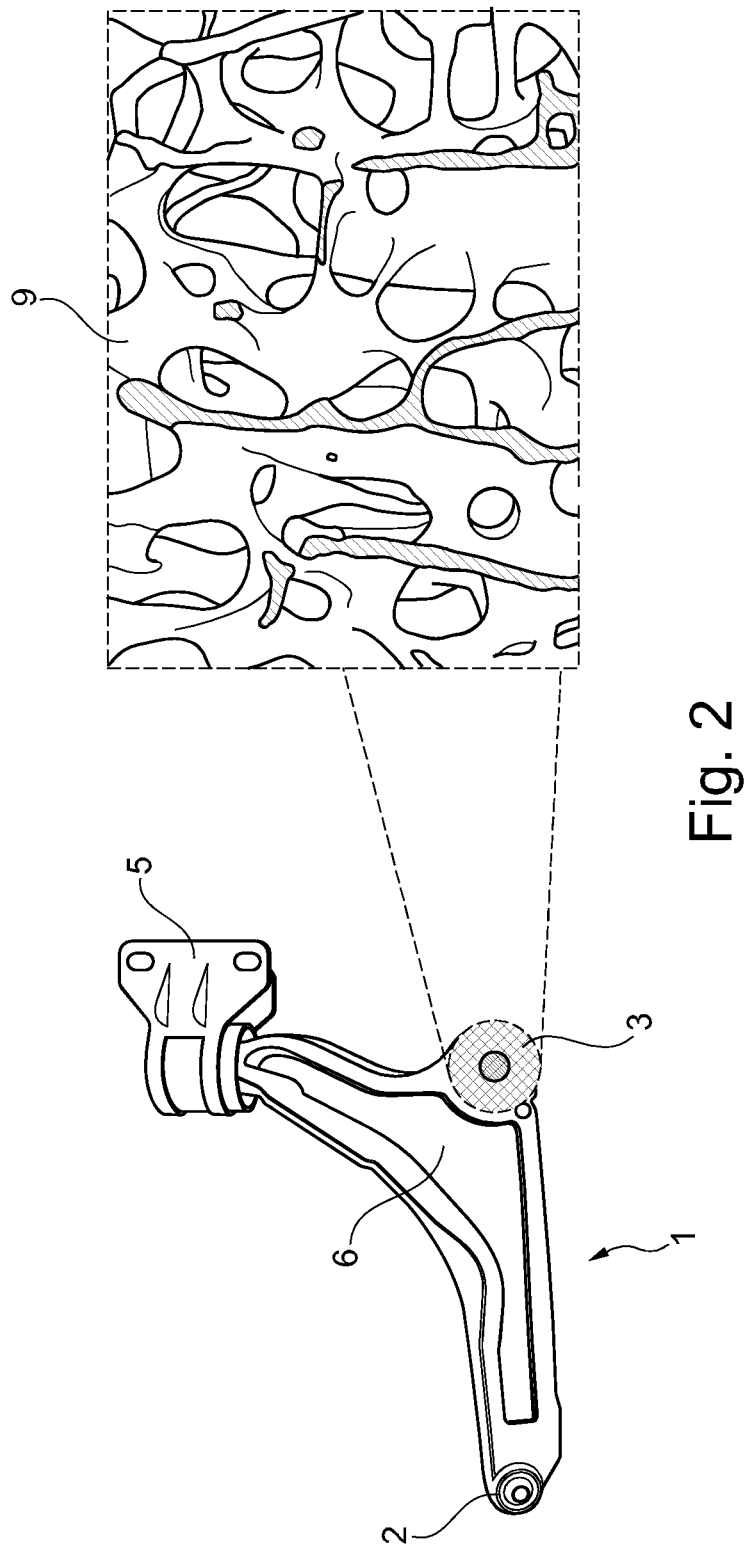
FIG. 2 is a bottom view of the transverse link of FIG. 1, including a detail view of its bone-like attachment structure.

FIG. 2 shows in the left image half a bottom view of the transverse link 1 from FIG. 1. This view shows that the structure-side attachment structure 3 or the bushing is also produced in a generative manner. In this form, the attachment structure 3 is constructed as a bone-like, bionic structure 9, as can be seen clearly in the enlarged view in the right half of the image. This bone-like structure 9 connects an inner sleeve (not visible in FIG. 2) of the bushing 3 to an outer sleeve of the bushing 3, which outer sleeve surrounds the inner sleeve with spacing and is also not visible in FIG. 2. Via the construction of the bionic structure 9, for example, hollow space or pore size, wall thickness and the like, a desired rigidity and flexibility of the attachment structure 3 can be adjusted in a selective manner.

FIG. 3A is a plan view (lower half of the image) and a cross-section (upper half of the image) of a structure-side attachment structure 10 of another form of a transverse link 11 according to the present disclosure. The structure-side attachment structure 10 is a generatively produced bushing which has an inner sleeve 12 and an outer sleeve 13 which surrounds the inner sleeve with spacing, which sleeves are connected to each other by a fold-like or undulating structure 14. The fold-like structure 14 enables in a particularly advantageous manner, for example, by selecting the number of folds and/or the thickness of the folds, the rigidity and flexibility of the sleeve 10 to be defined, as may also be provided, for example, by a conventional rubber bushing. In the form shown in FIG. 3A, the fold-like structure 14 is constructed so as to completely surround the inner sleeve 12.

FIG. 3B is a plan view (lower image half) and a cross-section (upper image half) of a structure-side attachment structure 15 of another form of a transverse link 16 according to the present disclosure. The structure-side attachment structure 15 is a generatively produced bushing which has an inner sleeve 12 and an outer sleeve 13 which surrounds the inner sleeve with spacing, which sleeves are connected to each other by a fold-like or undulating structure 17. The fold-like structure 17, in a particularly advantageous manner, for example, by selecting the number of folds and/or the thickness of the folds, enables the rigidity and flexibility of the bushing 15 to be defined. In the form shown in FIG. 3B, the fold-like structure 17 is constructed so as to surround the inner sleeve 12 in the form of a star. To this end, the fold-like structure 17 is divided into individual radially extending beams (in the variation shown, 8 in number) which are spaced apart from each other in a peripheral direction.

The transverse link according to the present disclosure described above and the associated production method are not limited to the forms disclosed herein, but also comprise other similarly acting forms. In particular, different constructions of transverse links are conceivable. A transverse link in the context of the present disclosure may, for example, have a single wheel-side attachment structure and a single structure-side attachment structure so that it substantially has a rod-like, elongate construction. A transverse link in the context of the present disclosure may, for example, also have two structure-side attachment structures and a single wheel-side attachment structure so that it substantially has a triangular, planar construction. In addition, a transverse link in the context of the present disclosure may, for example, also have two wheel-side attachment structures and two structure-side attachment structures and consequently substantially have a trapezoidal, planar construction.

In one form, the transverse link according to the present disclosure is used in a wheel suspension of a vehicle, in particular a motor vehicle.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A transverse link for a wheel suspension of a vehicle, the transverse link comprising:
    at least one wheel-side attachment structure;
    at least one structure-side attachment structure; and
    a connection structure connecting and extending between the attachment structures,
    wherein the connection structure is produced by a conventional production method, and
    wherein at least one of the attachment structures is constructed as a generatively produced bushing printed on the connection structure and having an outer sleeve surrounding an inner sleeve and a fold structure connecting the inner and outer sleeves.

2. The transverse link according to claim 1, wherein at least one of the attachment structures that is produced in the generative manner is constructed at least partially in at least one of a porous, a bionic, a grid, and a honeycomb structure.

3. The transverse link according to claim 1, wherein the connection structure and the attachment structures are at least two different materials.

4. The transverse link according to claim 3, wherein the different materials are different metals and different metal alloys.

5. The transverse link according to claim 1, wherein at least one of the attachment structures is a ball joint or a journal.

6. A generatively produced attachment structure for use in a transverse link for a wheel suspension of a vehicle, the transverse link comprising:
    a wheel-side attachment structure;
    a structure-side attachment structure;
    wherein at least one of the wheel-side attachment structure and the structure-side attachment structure is generatively produced and comprises an inner sleeve and an outer sleeve surrounding the inner sleeve; and
    a connection structure produced by a conventional production method and connecting and extending between the attachment structures;
    wherein the inner sleeve is connected to the outer sleeve by at least one of a fold structure, an undulated structure, and a bone structure, and the outer sleeve is generatively produced and printed on the connection structure.

7. The generatively produced attachment structure according to claim 6, wherein at least one of the generatively produced attachment structures is at least one of a bushing, a ball joint, and a journal.

8. The generatively produced attachment structure according to claim 6, wherein at least one of the generatively produced attachment structures is at least two different materials.

9. The generatively produced attachment structure according to claim 8, wherein the different materials are different metals and different metal alloys.

10. The generatively produced attachment structure according to claim 6, wherein the structure-side attachment structure is at least one of a bushing and a journal, and the wheel-side attachment structure is a ball joint.

11. The generatively produced attachment structure according to claim 6, wherein the structure-side attachment structure is a journal received by a journal retention member.

12. A method for producing a transverse link for a wheel suspension of a vehicle, the method comprising:
    producing at least one wheel-side attachment structure and at least one structure-side attachment structure; and
    connecting the at least one wheel-side attachment structure to the at least one structure-side attachment structure by a conventionally produced connection structure extending therebetween,
    wherein at least one of the attachment structures is produced by a generative production method and is printed on the connection structure, and
    wherein at least one of the attachment structures is constructed as a generatively produced bushing having an outer sleeve surrounding an inner sleeve, wherein the inner and outer sleeves are connected to each other by a fold structure.

* * * * *